United States Patent Office 2,937,091
Patented May 17, 1960

2,937,091

STABILIZED FAT-SOLUBLE VITAMIN AND METHOD OF MAKING SAME

Adolf Rosenberg, Forest Hills, N.Y.

No Drawing. Application July 2, 1953
Serial No. 365,788

7 Claims. (Cl. 99—2)

This invention relates to feeds or supplements of feeds fortified with the fat-soluble vitamins. More particularly, it is directed to a novel dry composition containing the fat-soluble vitamins in a highly stabilized and physiologically available form.

The provision of means for fortifying feeds with supplements containing the fat-soluble vitamins in assured potencies is a problem which has commanded a vast amount of attention from scientists and technologists. Initially, it was thought sufficient to provide the fat-soluble vitamins for feed supplementation in such form that, until incorporation thereof in the feed, the vitamin content thereof was stabilized so as to withstand destruction or disintegration; and, further, that the feeds containing such supplements should exhibit a retention of the vitamin potency comparable to that of the supplements prior to their incorporation in the feed. However, an even greater and more perplexing problem exists with respect to providing a fat-soluble vitamin supplement that can be included as a component of mineral supplements or mineral concentrates that are now used to provide the necessary or essential trace-mineral supplementations of the basic feed rations.

The first successful solution of the problem of stabilizing fat-soluble vitamins, especially vitamin A, in a supplement that exhibited excellent retention of the vitamin potency was achieved by Melnick (U.S. Patent No. 2,496,634). His solution to the problem resided in providing dry, discrete particles of a high melting fat embodying the fat-soluble vitamins, which particles or granules are distributed in a powdery base, as of soy flour or soy meal, as a protective vehicle. The particles are made by incorporating the fat-soluble vitamins in a molten fatty base, and subsequently manipulating the mass of molten fat with the vitamins distributed uniformly therethrough into the ultimate granules.

However, the Melnick product cannot be incorporated as a component of a mineral concentrate used for the purposes above described. In the presence of the minerals, the Melnick product suffers severe rapid destruction of the vitamins, especially vitamin A.

In my co-pending application, Serial No. 220,333, filed April 10, 1951, I have described a product which consists of dry, discrete particles or granules embodying the fat-soluble vitamins, as for example vitamin A. Those particles differ from the Melnick particles in that the bulk of the vitamin A therein is substantially disposed or concentrated at the center of the particle. In those particles the vitamin portion constitutes a core which is encased by a fatty shell or skin that insulates the vitamin against the attack of the destructive agents. In my copending application I have shown that such encasement of the vitamin-rich core by a fatty shell or skin can be achieved by using soya flour as a means for absorbing or seizing the vitamin and carrying it to the center of the sphere.

I have described therein a method of producing the granules of the vitamin-core and fatty shell physical structure. That method comprises preparing a molten mixture of a high melting fat in which is incorporated soya flour and vitamin A; then spraying that fluid mixture to produce individual globules which, on solidifying, form dry, discrete granules. During the solidification of the globules, the particles of soya flour containing the absorbed vitamin are concentrated toward the center so that the resultant solidified globules have the physical structure of a vitamin-rich core surrounded by a fatty shell.

In this connection it is to be noted that in the efforts to achieve the stabilization of the fat-soluble vitamins, especially vitamin A, by incorporating the vitamin in dry, discrete granules, as initiated by Melnick, it was sought to utilize fats of high melting point. Others have striven to use carriers or vehicles of even higher melting points so as better to protect the vitamins against oxidation.

However, the employment of carriers or vehicles having inordinately high melting points offers no true solution to the problem, because inordinately high melting points interfere with the physiological availability of the vitamin. If, for example, a labile vitamin be enclosed or encased in a tin or aluminum shell, the vitamin would be stabilized against the destructive effects of oxidation. If such an encapsulated vitamin is made a component of a mineral concentrate, the tin or aluminum shell, indeed, provides a barrier against the oxidative action, particularly the catalytic inducement of oxidation by minute quantities of iron and copper in the mineral mixture. But, it will be obvious that the physiological availability of the vitamin in such a product would be nil unless the digestive process of the animal were of such sufficient chemical reactivity as to dissolve the metal shell and thereby release the vitamin. In coping with this problem of providing dry, discrete granules which can be used for furnishing supplements of fat-soluble vitamins that can be incorporated in mineral concentrates so as to provide complete supplements for the basic ration, I have sought to discover means for achieving an encapsulation of the vitamins that provides an even more effective barrier against oxidative influences than does the fatty shell or skin of the granules described in my aforesaid co-pending application.

It is recognized that encapsulation of labile vitamins in the form of pharmaceutical tablets or capsules is old in the art. Such products are, however, unsuited for use as feed supplements since one animal or bird in one feeding might obtain a super dose of the vitamin at the expense of that allocated to all the animals or birds receiving the feeding with the vitamin supplement. This makes it mandatory that the vitamin supplement be encapsulated for protective purposes in exceedingly small spheres or beads of diameters of not more than 2 mm. Whereas each sphere may be of high vitamin potency per unit weight, the very large number required to fortify the feed makes for uniform fortification of the entire feed, it is this problem of protective encapsulation of minute spheres containing the labile, fat-soluble vitamin material with which my aforesaid co-pending application and the present application are concerned.

In the course of my investigations I discovered that the encasement of the vitamin contained in the fatty core by a shell that is an effective barrier against the oxidative activity above described could be achieved by means of a proteinaceous shell which possesses marked physical stability but is, nevertheless, soluble in the alimentary tract. Indeed, as will be shown hereinafter, that physical stability is coupled with insolubility in water and even in the stomach secretions. The actual solution of the shell takes place in the animal's intestinal tract so that the vitamin is released only in that part of the alimentary tract where, as scientific investigations are now bringing to light, the vitamin is in fact utilized.

In this connection it is to be noted that apparently anomalous results in bio-assays of vitamin A (findings of potencies exceeding the theoretical or those found by chemical tests) of products made in accordance with the encapsulating procedures described in my co-pending application are due to the fact that when vitamin A is fed or administered in the form of non-encapsulated fish liver oil, a portion thereof undergoes partial destruction in the upper part of the alimentary tract (the stomach) so that only a fraction of the ingested vitamin is actually utilized in the physiological process.

As has been mentioned, the vitamin content of Melnick's product is unable to withstand the destructive effects of minerals. Thus, I have found that when one (1) part of the Melnick product (his example III) is incorporated in one (1) part of the following mineral concentrate:

| | Grams |
|---|---|
| Manganese sulfate, $MnSO_4.4H_2O$ | 74 |
| Potassium iodide, $KI$ | 6 |
| Ferrous sulfate, $FeSO_4.4H_2O$ | 73 |
| Copper sulfate, $CuSO_4.5H_2O$ | 11 |
| Zinc sulfate, $ZnSO_4.7H_2O$ | 4 |
| Cobalt sulfate, $CoSO_4.H_2O$ | 0.6 |
| Calcium carbonate, q.s. 20 pounds. | | to provide a product containing 280 U.S.P. units of vitamin A per gram, the retention of the vitamin A therein is very poor. The mixture shows a loss of from 95 percent to 100 percent of the vitamin A at the half-way stage of the storage period, i.e., 10 days at 45° C., the equivalent of 3 months at room temperature.

The destruction of the vitamin D also under those conditions, although not as complete as vitamin A, is, however, severe. Mineral mixtures fortified with the Melnick compositions to an initial potency of 100 U.S.P. units of vitamin D per gram show a destruction of that vitamin of from 50 to 60 percent at the end of ten (10) days' storage at 45° C.

In my studies, vitamin A was determined according to the method of H. O. Schaeffer, J.A.O.A.C., volume 33, page 615 (1950), subject to the U.S.P. XIII biological assay for confirmatory purposes, and vitamin D by the chick-bone-ash method, as described in A.O.A.C., sixth edition (1945).

It is to be noted that since mineral supplements are per se indestructible, they are, therefore, stored for much longer periods than other feed supplements prior to use. Suppliers of such supplements to feed manufacturers or to farmers can not tolerate such excessive losses of the costly vitamins. Hence, complete supplements which combine both minerals and vitamins with guaranteed vitamin potencies do not exist.

In a compromise but very limited solution of the problem, the mineral mixture is diluted with quality protein supplements (fish meal, milk protein, meat scrap, etc.), viz.: one part minerals + two parts protein; and such mineral and protein mixture is supplemented with the stabilized vitamin preparations of Melnick. A rapid turnover (short storage period) of the product is encouraged, but infrequently observed. But even here the vitamin A losses are still large, 60 to 83 percent of the vitamin A being destroyed within the first 10 days at 45° C. or 3 months at ordinary temperatures (initially 86 U.S.P. units per gram). Therefore, such protein-mineral-vitamin supplements must not only be manufactured with huge overages of the labile vitamins, but they also must be consumed within a period of less than 3 months after vitamin fortification—if they are to evidence nutritional value. It is clear that such initial surcharging of a product with the labile vitamins in order to provide an adequate vitamin potency when it is fed to the animals is not only economically wasteful, but results in the pricing thereof at an inordinately high figure.

Since it is recognized that a deficiency in the ration of one essential nutrient, viz., the vitamin A, interferes with animal growth, reproduction and even survival, despite liberal quantities of the other nutrients, feed manufacturers furnishing the raisers of farm animals with a ration supplements have longed for a solution to their problem of assuring that the vitamin A, E, or D potency of their product will indeed be adequate at the time of feeding.

The failure of the vitamin A in Melnick's compositions to be as stable in feeds and in mineral supplements, as in the compositions themselves, is attributable in part to separation of the vitamin A in the fat granules from the protective influence of the antioxidants in the soy flour base.

The addition of one part of Melnick's composition, the vitamin containing granules in the powdery base, to 99 parts of a feed, even one containing soybean meal in concentrations of 30 percent reduces the protective influence on the vitamin A of the antioxidants in the Melnick soy flour base. Whereas the vitamin A product itself contains only soybean meal or flour around the fat particles embodying the vitamin A, in the feed, on the contrary, there are at least two parts of the other types of feed constituents per one part of the soybean meal which are in contact with the vitamin A component. Melnick has shown that other bases are inferior to soybean meal or soybean flour in protecting the vitamin A granules. This observation has been confirmed by publications from other laboratories (Wall, M. E., and Kelley, E. J., Ind. and Eng. Chem., vol. 43, p. 1146 (1951); Burns, M. J., and Quackenbush, F. W., Ind. and Eng. Chem., vol. 43, p. 1952 (1951)).

In the case of mineral supplements fortified with Melnick's compositions, there is still another and more serious factor that contributes to the oxidative loss of the fat-soluble vitamins. The mineral supplements contain, in plentiful quantity, the so-called trace minerals iron and copper, notorious for their influence in promoting the rapid oxidation of both fats and vitamin A. Even if iron and copper salts are not deliberately included as components of some mineral supplements, the other mineral salts furnish, as contaminants, substantial quantities of these essential elements. A good poultry ration will provide about 200 mg. of iron per kilo of ration (200 parts per million), and about 15 mg. of copper per kilo. In the mineral supplement (concentrate) above described, the iron content is actually about 2000 parts per million and the copper content is about 300 parts per million.

I have found that such high concentrations of iron and copper exert a deleterious effect on the fat and on the vitamin A in Melnick's compositions. I have noted that as little as 3 parts per million of iron or 0.2 part per million of copper markedly affects the resistance of even hydrogenated fats to oxidative deterioration and of the vitamins A, D, E and K contained therein. The observation that the loss of vitamin A parallels peroxide formation in the oil carriers of the vitamin A has been reported by several investigators (Halpern, G. R., Ind. and Eng. Chem., Anal. Ed., vol. 18, p. 621 (1946); Dassow, J. A., and Stansby, M. E., J. Amer. Oil Chem. Soc., vol. 26, p. 475 (1949); Kehren cited by Piskur, M. M., J. Amer. Oil Chem. Soc., vol. 27, p. 211 (1950)). Thus, in supplementing mineral mixtures (and even feeds), with the Melnick composition, there results not only a dilution of his soybean meal base, but also the exposure of the fat particles, embodying the fat-soluble vitamins, to the catalytic pro-oxidant effects of iron and copper.

As has been mentioned above, the scientists and technologists who have grappled with the problem of stabilizing the fat-soluble vitamins as ingredients of feed supplements, have sought to achieve protection of those vitamins by embodying them in high-melting fatty substances. Some have even resorted to waxes.

The disadvantage of such recourse was recently announced at the Eighth Kansas Feed Conference, Kansas State College, Manhattan, Kansas, 1953. During that conference, D. B. Parrish, of Kansas State College, cautioned the conferees, as follows:

"It should be remembered that in products in which stability is provided by sealing the vitamin in, there is a risk that the product may be so unavailable that it will pass through the alimentary tract without being affected and will not be absorbed. Thus, while stability is desirable, a compromise sometimes must be made between stability and digestibility."

In order to provide for the physiological availability of the fat-soluble vitamins embodied in such materials, lecithin has also been incorporated as a component thereof. The lecithin is relied on to provide an intrinsic emulsifying agent that will make the high melting vehicle yield to the digestive processes, and thereby release the vitamin contained therein.

It has been discovered that fat-soluble acid molecules possess the property, in moisture-free fatty medium, of converting vitamin A into the unsaturated hydrocarbon, anhydro vitamin A.

That hydrocarbon is biologically inactive. However, it responds to the chemical colorimetric test (antimony tri-chloride) in a manner similar to the biologically active vitamin A.

I believe that lecithin (a fat-soluble acid molecule) has the effect of inactivating vitamin A; and it, therefore, may in part be responsible for the decrease with time (markedly accelerated by heat) in the biological potency of vitamin A preparations which contain substantial quantities of lecithin, viz., up to 5 percent, even when they are blended in an all soybean meal or soybean flour base.

In the compositions of my aforesaid co-pending application, the lecithin used in making the fatty beads may be responsible for a 15 percent loss of vitamin A, initially incorporated, as shown, for example, by product C of Example 1 therein, which assayed 86 U.S.P. units of vitamin A per gram, although the theoretical content thereof was 101 U.S.P. units.

In the course of my investigations which led to the present invention, I discovered that it was possible more effectively to stabilize the fat-soluble vitamins. That stabilization and protection, I discovered, could be achieved by the creation of dry, discrete spheres or beads of small size, i.e., of about 2 mm. or less in diameter, in which the vitamin is a component of a central core that is encased within an outer protective shell. The central core is a solid fat, the melting point of which, surprisingly, can be substantially below the high melting points that heretofore were sought for. This discovery that lower melting point fats can be used successfully makes it possible to omit lecithin; and also to assure the physiological availability of the vitamin. The dangers of too effective "sealing the vitamin in" discussed by D. P. Parrish, supra, are thus overcome.

In general, the spheres or beads of the present invention are less than 2 mm. in diameter. They are manufactured by dissolving a vitamin bearing oil or fat-soluble vitamin in the basic molten fat; adding (1) this vitamin-containing fat to (2) an aqueous solution of the proteinaceous material; heating the mixture of (1)+(2) to a temperature at which the protein could coagulate if the pH were more favorable; homogenizing the mixture to form an oil in water emulsion and spray-drying the emulsion. The resulting product is a mass of tiny spheres containing the fat-soluble vitamins, each sphere being formed of a fatty vitamin-containing core coated by, or enclosed within, a dry, water-resistant proteinaceous film. The dry vitamin spheres are free flowing, uniform and similar in structure, and will not "oil off" under regular conditions of storage for indefinite periods.

The vitamin bearing oils are fish liver oils, containing vitamin A and/or vitamin D, the synthetic vitamins in an edible oil solvent or in crystalline form—preferably the former because of improved stability prior to formulation, carotene in an edible oil vehicle, vitamin E in an edible oil solvent, and vitamin K in an edible oil vehicle or in crystalline form.

The fat of the central core of the spheres is one in which the fat-soluble vitamins exhibit excellent stability. Contrary to reports in the scientific literature, cited supra, I have discovered that the stability of the vitamins is not necessarily related to the stability of the basic fat component of the spheres. Using the active-oxygen method (A.O.M.) described by King, A. E., Roschen, H. L., and Irwin, W. H., Oil and Soap, volume 10, page 105 (1933), involving aeration of the basic fat components at 98° C., I have obtained the values shown in Table I for oxidative stability.

TABLE I

| Basic Fat Component | Melting Point, ° C. | Iodine Number | Hours to Peroxide Value of 100 me./kg. |
|---|---|---|---|
| Limpid corn oil |  | 126 | 12. |
| Limpid peanut oil |  | 94 | 25. |
| Hydrogenated cottonseed oil | 35 | 70 | 58. |
| Hydrogenated soybean oil | 43 | 68 | 280. |
| Hydrogenated peanut oil | 45 | 55 | 300. |
| Hydrogenated soybean oil | 50 | 52 | 385. |
| Hydrogenated peanut oil | 49 | 45 | 425. |
| Hydrogenated coconut oil | 37 | 1 | more than 500. |
| Hydrogenated babassu oil | 44 | 1 | Do. |

When these oils were used to make the vitamin spheres of this invention, I have obtained the following order of preference in so far as vitamin stability, exemplified by vitamin A stability, is concerned: hydrogenated soybean oil of 50° C. melting point, hydrogenated soybean oil 43° C. melting point, hydrogenated cottonseed oil, limpid corn oil, hydrogenated peanut oil of 45° C. melting point, limpid peanut oil, hydrogenated babassu oil, and lastly, hydrogenated coconut oil. However, by supplementing some of these basic fats with antioxidants which are preferentially soluble in oils, such as butylated hydroxyanisole to the extent of 0.02 percent of the fat used, the poorer fats are made equal to the best fats as a stabilizing vehicle for vitamin A. The use of the more powerful polyphenols, such as propyl gallate, is of no value in the products of the present invention. Whereas these polyphenols are very effective in stabilizing fats, they do not remain in the basic fat component of my preparations but migrate to, and are found in, the outer proteinaceous shell. In the presence of iron salts in mineral feed mixtures, they impart an objectionable blue discoloration to the vitamin spheres. Likewise, acid stabilizers, such as citric acid, dissolved or dispersed in the basic fat component, migrate to, and are found in, the outer proteinaceous shell. However, advantage has been taken of this apparent disadvantage of citric acid, which will be elaborated on infra. When the basic fat components in Table I are supplemented with butylated hydroxyanisole in 0.02 percent concentration, the order of preference for the basic fat components in so far as vitamin A stability is concerned, is directly related to preference based on the Active Oxygen Method (A.O.M.) values listed in Table I.

Vitamin spheres of stability superior to that of the prior art can be made without the addition of fat-soluble antioxidants, but for maximal vitamin retention, particularly when the spheres are mixed with mineral feed mixtures, the addition of the butylated hydroxyanisole is preferred.

Another factor which enters into the selection of the preferred basic fat components of the present invention is the melting point. I now find that the melting point is far less critical in producing a product which will not "oil off" during ordinary conditions of storage. Indeed, I can now use oils that are liquid at room temperature to form the cores of the spheres. The oil does escape through the proteinaceous shell. However, the spheres should not be subjected to high pressures that will fracture the shell, as in mixing with other ingredients, in packing the products, or in stacking flexible packages containing the vitamin spheres.

I prefer to use fats that are solid at room temperature, and especially those that remain solid at room temperature, after blending with the vitamin oils. When the vitamins in a liquid oil vehicle are added, I prefer to use the hydrogenated fats with a melting point above 45° C. When the vitamins are in crystalline form, or of such high potency that the liquid oil vehicle is negligible in amount (less than three times that of the weight of the vitamin itself), I prefer to use the hydrogenated fats with a melting point of 35° C. to 45° C. In other words, my preference is for a vitamin-basic fat blend with a melting point of 35° to 45° C. With the preferred basic fat components of the present invention, used according to the above scheme, I obtain vitamin spheres which show no oil leakage when held at 45° C. for extended periods, viz., up to three weeks. This surprising finding now makes it unnecessary to use high-melting fats (above 50° C.), and thus unnecessary to add lecithin to the vitamin-fat blend to render the vitamins physiologically available for absorption. By omitting the lecithin, I find that the products suffer less loss of vitamin A during the heating and spray drying of the emulsion. Of course, high-melting fats, and even waxes, with or without added lecithin, may be used, but these entail disadvantages—decreased stability or decreased physiological availability of the vitamins—so that such items are not the preferred vitamin products of this invention.

The proteinaceous material used in the products of the present invention should contain on the dry basis at least 20 percent of protein and should be heat coagulable in aqueous solution at a temperature of 65° C. to 85° C. when the pH of the solution is between 4.0 and 5.0. Proteinaceous material that has already been denatured by heat-processing so that the material is no longer soluble in water, cannot be used in making the products of this invention. Solvent-extracted but not heat-processed soy flour is preferred as the material to form the outer protective shell that encases the vitamin-fat cores of the spheres. I have also discovered that other proteinaceous materials such as wheat gluten and low-heat skim milk powder (or skim milk) serve also as good proteinaceous sources for coating the vitamin-fat spheres. These materials satisfy the above definition of an acceptable proteinaceous component. Combinations of the proteinaceous materials may be employed. The object is to obtain a tough, water-resistant proteinaceous shell or film around the fat core, i.e., one that does not release the fat component simply on the addition of water. I rely upon the proteolytic enzymes in the digestive tract to solubilize the tough protein film, thereby making the vitamin-fat core available for digestion and absorption.

In making the products of the present invention the proteinaceous material in water solution, in concentrations of from 3 to 10 percent expressed on a protein basis, preferably from 5 to 8 percent, is brought to a temperature of about 10° C. above the melting point of the vitamin oil-basic fat blend. The water-soluble B vitamins such as riboflavin, niacin, calcium pantothenate, and vitamin $B_{12}$, may also be added, depending on how broad a coverage of the vitamin spectrum is desired in the end-product.

The fat-soluble vitamin-basic fat blend is prepared separately by dissolving the vitamin oils or synthetic vitamins in the basic fat component held at a temperature of about 10° C. about the melting point of the fat. The aqueous and fat solutions are mixed, preferably under nitrogen, in a tank equipped with a motor-driven propeller agitator. During the period of agitation of about 10-30 minutes, the mixture is heated to a temperature of from 65° C. to 85° C. The time and temperature of heating can be modified. For example, when citric acid is dissolved in the aqueous phase in concentrations of from 2 to 6 percent of the protein component, the pH of the aqueous phase decreases from about 6.6 to a value of from 6.3 to 6.0. This decrease in pH makes protein components desirably more susceptible to heat coagulation. Under such circumstances, it is prefered to heat-process the aqueous-fat mixture at about 65° C. for a period of about 10 to 15 minutes to obtain a moisture-resistant shell. In the absence of the added citric acid, the higher temperature and longer period of heating is preferred. The citric acid in the proteinaceous shell encasing the vitamin-fat cores of the spheres serves two useful purposes, viz.: (a) it prohibits, by a metal sequestering action, the prooxidant metals, such as iron and copper, from exerting their deleterious influence on the labile fat-soluble vitamins and on the fat within the spheres; and (b) it supplies a favorable stabilizing acid environment in the shell wherein the water-soluble B vitamins are deposited, should these be included in the formulation.

The aqueous-fat mixture with a total solids content of 30 to 40 percent, water being added if necessary, is then homogenized at a pressure of 2,000 to 4,000 pounds per square inch. This action leads to the formation of a fat in water emulsion, i.e., small fat globules dispersed in the continuous proteinaceous aqueous phase. The emulsion is preheated in a continuous tubular heat exchanger, and then passed through a high pressure pump necessary to force the emulsion at a pressure of 2,500 to 4,000 pounds per square inch through the nozzles of the spray dryer. I have found the Rogers No. 20 Spray Dryer of 1200-lb. per hour capacity to be highly satisfactory. Spraying Systems' core-type nozzles with removable core and orifice inserts give excellent results. The optimal nozzle opening in the spray-drying operation is about 0.030 inch. The temperature of the incoming hot air ranges preferably between 150° C. to 160° C., and the outgoing air between 80° C. to 85° C. In using the Gray-Jensen Dryer, a spray nozzle of about 0.06 inch in diameter is preferred, with the incoming hot air at about 125° C. to 130° C. During the spray-drying operation, the moisture content of the spheres with their shells of denatured protein is reduced to a maximum of 2 percent. An automatic screw-type unloading unit continuously removes the product from the dryer. An astonishing finding in my investigations, is that the readily oxidizable vitamins, such as vitamin A, carotene and vitamin E, are destroyed to a negligible degree; less than 10 percent in the spray-drying operation, despite the use of air of high temperature in the drying operation. It is important that the spheres with the vitamin-fat cores and the core-encasing protective shell be removed from the spray-drying chamber as quickly as possible and passed through a cooling tunnel. The final product of particle size less than 2 mm. in diameter is sifted and packaged, preferably in a container of structural strength such as a fibre-board drum.

I believe that the conversion of water to steam in the drying operation produces an inert gas (steam) blanket around the spheres protecting them from oxidation. The temperature of the spheres is probably well under 35° C., due to the cooling effect of the evaporating water. Since the temperature of the spheres climbs as soon as the water is volatilized off, they should be removed rapidly from the spray chamber and quickly cooled to a temperature of about 25° C. to 30° C. or less.

The products of the present invention contain from 40 to 90 percent of the vitamin oil-basic fat component and from 60 to 10 percent of the proteinaceous component. Preferably, the ratio of the inner fat core to the outer protective shell, on a weight basis, is 50-80 parts of the core to 50-20 parts of the shell.

It is among the principal objects of this invention to provide a dry product containing the labile, fat-soluble vitamins in the form of small, dry, discrete, spherical bodies comprising a fat-soluble, vitamin-containing core encased within a protective, organic shell.

A further object of this invention is to provide a small, spherical body, such as is mentioned above, having an improved protective shell that is especially resistant to the pro-oxidative effects of minerals; and particularly the pro-oxidative effects of iron and copper.

A still further object of this invention is to provide a spherical body containing the fat-soluble vitamins of the class described above wherein the shell is a heat-denatured, water-resistant, proteinaceous material.

A still further object of this invention is to provide small spherical bodies containing fat-soluble vitamins wherein the proteinaceous shell is derived from soy flour.

An additional object of this invention is to provide the spherical bodies containing the fat-soluble vitamins, as described above, wherein the protective, encasing shell also contains water-soluble vitamins of the vitamin B complex.

An even further object of this invention is to provide for the stabilization of vitamins embodied in high-melting fats by omitting lecithin, which has heretofore been considered necessary to assure the physiological availability of the vitamins.

A further object of this invention is to provide a feed concentrate of high mineral content containing iron and copper and also the labile, fat-soluble vitamins that is characterized by marked stability of the labile vitamins when said feed concentrate is stored for long periods of time.

A still further object of this invention is to provide feed supplements containing both minerals and the fat-soluble vitamins which stockmen and poultrymen can add to the basic grains and forage that are available locally to them in order to provide their livestock with nutritionally well-balanced rations.

A still further object of this invention is to provide a novel means, as by the use of an external barrier citric acid, to interact with pro-oxidant minerals, particularly iron and copper, and thereby insulate the labile, fat-soluble vitamins, especially vitamin A, from the destructive effects of said minerals.

The foregoing objects as well as further objects and advantages of this invention will become apparent from the following detailed description thereof as exemplified by (a) my initial discoveries and fundamental conception that the fat-soluble vitamins are most effectively stabilized and protected when they are components of beads which are small, discrete, spherical bodies comprising a fat-soluble, vitamin-containing core encased within a protective shell that provides a barrier against the action of vitamin-destroying agents, as set forth in my aforesaid co-pending application, and (b) the means for attaining an improved realization of the foregoing, as exemplified by illustrative embodiments thereof in the several examples, infra:

Example 1

In one tank 97.0 parts of coconut oil, hydrogenated to an iodine number of 1.0 and having a melting point of 37° C., is heated to about 47° C. To this are added 0.02 part of butylated hydroxyanisole, 0.025 part of crystalline vitamin $D_3$ of a potency of 40,000,000 A.O.A.C. units per gram, and 3.0 parts of vitamin A palmitate in corn oil having a potency of 1,100,000 U.S.P. units per gram. The mixture is stirred under nitrogen for a period of about 15 minutes to effect a clear solution.

In another tank 31 parts of solvent-extracted non-heat-processed soy flour containing about 50 percent protein (nitrogen×6.25) are suspended in 300 parts of warm water at about 40° C. and stirred for a period of about 15 minutes until the soy flour is dissolved. Two parts of citric acid are then dissolved in this solution.

The contents of the two tanks are mixed under nitrogen and heated by steam coils to a temperature of about 65° C. for a period of 20 minutes. The aqueous-fat mixture is homogenized at a pressure of 3,000 pounds per square inch to yield a fat in water emulsion.

The emulsion containing about 32–33 percent of solids is spray dried as described above to produce dry, discrete beads or spheres (hereinafter referred to as the "final product"). This final product has the physical structure of a vitamin-fat core encased within a protective spherical coating of the water-resistant heat-denatured protein film, the diameter of the spheres measuring less than 2 mm. and the spheres containing less than 1 percent moisture. The ratio of the fatty-vitamin-containing core to the protective coating is as 75:25.

Assays conducted on the final product as thus manufactured indicated a vitamin A content of 11,000,000 U.S.P. units per pound (a loss of only 2 percent as a result of the process) and 3,400,000 A.O.A.C. units of vitamin $D_3$ per pound (no measurable loss as a result of the process).

When one part of this product is added to 39 parts of the mineral supplement above described, and this mixture of minerals and the vitamin product is stored at 45° C. for a period of 21 days, fully 88 percent of the vitamin A and all of the vitamin $D_3$ are retained, the vitamin A dropping from an initial value of 605 units per gram to 532 units per gram while the vitamin $D_3$ remained constant at 185–190 units per gram. In complete feed mixtures made from this final product, simulating the complete feed mixtures described by Melnick, no measurable losses of the vitamins were noted after the 21-day holding test at 45° C.

In the above and following examples, A.O.A.C. units of vitamin $D_3$ are synonomous with International Chick Units.

Example 2

In one tank 83.0 parts of hydrogenated soybean oil, hydrogenated to an iodine number of 52 and having a melting point of 50° C., is heated to about 60° C. To this are added 2.0 parts of vitamin $D_3$ in corn oil (400,000 A.O.A.C. units/gram), 10.0 parts of vitamin A in fish liver oil (180,000 U.S.P. units/gram), 5.0 parts of vitamin E in cottonseed oil (35 percent mixed tocopherols) and 0.10 part of vitamin K (2-methyl-1,4-naphthoquinone). The mixture is stirred under nitrogen for a period of about 15 minutes to effect a clear solution.

In another tank 100 parts of skim-milk powder (low heat) are suspended in 400 parts of water; and the temperature brought to about 55° C.

The contents of the two tanks are mixed under nitrogen and heated by steam coils for a period of 30 minutes at a temperature of 80° C. This aqueous-fat mixture is then homogenized, as described in Example 1, and spray dried to produce dry discrete spheres in accordance with the method described in Example 1.

The product of this example are spheres having a diameter of less than 2 mm. They are similar in physical structure to the product of Example 3, consisting of a fat-containing vitamin core encased within a protective shell or coating of water-resistant heat-denatured protein. The ratio of the fatty core to the proteinaceous shell is as 50:50.

Assays conducted on the final product of this example indicated the following potencies per pound:

| Vitamin Component | Calculated | Found |
|---|---|---|
| Vitamin A | 4,090,000 USP units | 3,700,000 USP units. |
| Vitamin $D_3$ | 1,820,000 AOAC units | 1,800,000 AOAC units. |
| Vitamin E | 4,000 mg | 4,150 mg. |
| Vitamin K | 227,000 AOAC units | 220,000 AOAC units. |

Vitamins A and $D_3$ were determined by the methods above described. Vitamin E was determined by the colorimetric method for estimation of tocopherols described by H. W. Rawlings, Oil and Soap, vol. XXI, p. 257 (1944). Vitamin K was determined by the blood clotting assay with chicks (A.O.A.C., Sixth Edition (1945)). With the exception of vitamin A, of which a loss of about 10 percent was experienced, no significant losses of vitamins were noted in the production of the above product. The increase in vitamin E is attributable to the fact that the soybean oil, the fatty component, contributes measurable quantities of tocopherols.

When one part of the product of this example is added to 14 parts of the minerals supplement or concentrate above described, and this mixture of minerals and vitamins is stored at 45° C. for a period of 21 days, fully 80 percent of the vitamin A and more than 90 percent of the other vitamins were retained. Complete feed mixtures made with the product of this example, simulating the complete feed mixtures described by Melnick, showed retentions of more than 90 percent of the vitamins after the 21-day holding test at 45° C. It is to be noted that the surprising stability of the product of this example, containing no free soybean flour or soybean meal, is in sharp contrast to the reports in the scientific literature and the teaching of Melnick. They reported that the vitamin A-containing beads had to be distributed in the soybean meal in order fully to stabilize the vitamin A.

*Example 3*

In one tank, 94.0 parts of hydrogenated babassu oil, hydrogenated to an iodine number of 1.0 and having a melting point of 44° C., is heated to about 55° C. To this are added 0.02 part of butylated hydroxyanisole, 1.0 part of vitamin A acetate concentrate (2,400,000 U.S.P. units/gram), 0.015 part of crystalline vitamin $D_3$ (40,000,000 A.O.A.C. units/gram), 5.0 parts of vitamin E in cottonseed oil (35 percent mixed tocopherols), and 0.10 part of crystalline vitamin K (2-methyl-1,4-naphthoquinone). The mixture is stirred under nitrogen to effect a clear solution.

In another tank 50.0 parts of solvent-extracted, non-heat processed soybean flour, 41.0 parts of skim-milk powder (low heat) and 1.8 parts of citric acid are suspended in 400 parts of warm water and stirred until the soy flour is dissolved. Then to this solution there are added 1.8 parts of riboflavin, 4.2 parts of niacin, 1.2 parts of calcium pantothenate, 0.0036 part of vitamin $B_{12}$ and the mixture stirred to effectuate solution. The temperature of this solution is raised to about 50° C.

The contents of the two tanks are mixed under nitrogen and are heated by steam coils to a temperature of about 85° C. for a period of 30 minutes. This aqueous-fat mixture is homogenized, as described in the foregoing examples to yield a fat-in-water emulsion.

The emulsion is spray-dried as described above to produce dry, discrete beads or spheres having a diameter of less than 2 mm., the spheres being similar in structure to those above described. The ratio of the fatty core to the water-resistant, heat-denatured, protective coating is as 50:50. The fat-soluble vitamins are present in the cores of said spheres in a highly stable fat containing the added butylated hydroxyanisole which overcomes the deficiency of the base fat in fully protecting the labile, fat-soluble vitamins. The water-resistant shell encasing the fatty core contain citric acid which prevents the pro-oxidant effects of iron and copper in mineral mixtures and in feeds from exerting their destructive effects on the fat-soluble vitamins. The stability of the fat-soluble vitamins during the spray-drying operation, and during subsequent storage of the spherical bodies as such in the mineral mixture (concentrate), described supra, and in feeds was comparable to that noted for the vitamins A and D in Example 1 and for the other vitamins in Example 2.

The water-soluble B vitamins are embedded in a heat-denatured, protein matrix of pH about 6.2 that constitutes the encasing shell for the cores. Those water-soluble vitamins exhibit superior stability in that environment. The high-heat treatment in a somewhat acid environment prior to the spray-drying is especially desirable in eliminating the reducing activity of skim-milk solids which I believe is responsible for excessive vitamin $B_{12}$ losses in conventionally spray-drying skim-milk, preheated at the lower temperature of about 65° C.

It will be observed that the products of this invention are characterized, inter alia, by having a structure in which the fat-soluble vitamins are present in a core of exceedingly small size that is encased by a dry, water-resistant, heat-denatured, protein protective shell. When suspended in water and agitated the spherical bodies do not readily release the fat component.

Since the melting point of the fat employed in building the spherical bodies is sensibly less than the melting points of the materials used for "sealing the vitamin in" in the products mentioned by Parrich supra, I have investigated the physiological availability of the vitamins in my novel spherical bodies. Use was made of the criteria of growth response and feed consumption of day-old chicks subsisting on a basal adequate ration but free of vitamin A, supplemented in one series with the products of the present invention and in another with a vitamin A feeding oil, and in another with the U.S.P. Vitamin A Reference Standard. It was discovered that the vitamin A in the products of this invention were actually utilized, unit for unit, more efficiently than the vitamin A in the form of either the commercial feeding oil or the U.S.P. Reference Standard. The growth response during the 8-week test period in relation to physicochemical assay, indicated vitamin A potencies about 15 percent greater in the case of the products of this invention. The feed efficiency—grams gain in body weight per grams consumed—was 60 to 100 percent superior with the rations containing the products of the present invention when compared with the rations containing the vitamin A feeding oil. I believe that the water-resistant protein protective shells that encase the fat-soluble, vitamin-containing cores of my novel beads are not readily digestable until the product enters the small intestine. At this point, proteolytic activity removes completely this outer layer leaving the fat core available for digestion and absorption. When vitamin A in an oil vehicle, such as in the commercial feeding oil, enters the stomach partial destruction of the vitamin A occurs due in part to gastric acidity. In other words, the products of this invention are not only far more stable in vitro but also in vivo when compared with vitamin A in an oil vehicle. This explains the greater-than-theoretical vitamin A potency of the products of this invention.

The ratio of the core containing the fat-soluble vitamins to the encasing protective shell should not be less than as 40 to 60, and not more than as 90 to 10.

Preferably, the protein content of the shell should be at least 20 percent.

When citric acid is incorporated in the proteinaceous shell, it should not be present in an amount exceeding 6 percent; and the lower range should be preferably about 2 percent.

If an anti-oxidant such as butylated hydroxyanisole is used, it is preferable not to incorporate more than 0.1 percent thereof.

The fat-soluble vitamin content of the fatty core will depend upon the desired vitamin potency of the beads; such potency being adjustable with respect to the manner in which the beads are to be used. Since these stabilized, fat-soluble, vitamin-containing beads are supplements to be incorporated in the feed ration, either directly or as components of a mixed mineral-vitamin supplement or the like, the potencies should be such that it will be easy to incorporate a sufficient bulk of the supplements in the mass of the ration as to prepare a ration having a uniform potency of requisite nutritional level.

It will be understood that the foregoing description of this invention and the exemplary embodiments set forth are merely illustrative of the principles thereof; and, accordingly, that the appended claims are to be con-

I claim:

1. Process of making dry, discrete beads containing stabilized fat-soluble vitamin in a fatty core which is encased in a heat denatured, water-resistant proteinaceous digestible shell, said process comprising mixing a solution of fat-soluble vitamin in a fat having a melting point of about at least 35° C., at a temperature of about 10° C. above the melting point of the fat with an aqueous solution of a heat coagulable, proteinaceous material, heating the mixture to about 65°–85° C. for a period of about 10–30 minutes, homogenizing said mixture containing about 30% to 40% of total solids to form an emulsion with the oil as the finely dispersed internal phase, and spray drying said heated emulsion to complete the denaturation.

2. Process of making dry, discrete beads containing stabilized fat-soluble vitamin in a fatty core which is encased in a heat denatured, water-resistant proteinaceous digestible shell, said process comprising mixing a solution of fat-soluble vitamin in a fat having a melting point of about at least 35° C., at a temperature of about 10° C. above the melting point of the fat with an aqueous solution of a heat coagulable, proteinaceous material, and citric acid, heating said mixture having a pH of about 6.0–6.3 to about 65°–85° C. for a period of about 10–30 minutes, homogenizing said mixture containing about 30% to 40% of total solids to form an emulsion with the oil as the finely dispersed internal phase, and spray drying said heated emulsion to complete the denaturation.

3. Process in accordance with claim 1, wherein the fat soluble vitamin is vitamin A.

4. Process in accordance with claim 2, wherein the fat soluble vitamin is vitamin A.

5. Dry, discrete beads containing stabilized fat soluble vitamin, said beads being small, discrete, substantially spherical bodies, comprising a fat core containing a fat-soluble vitamin encased within a heat denatured water-resistant proteinaceous digestible shell, said beads being prepared by the method of claim 1.

6. Dry, discrete beads containing stabilized fat soluble vitamin, said beads being small, discrete, substantially spherical bodies, comprising a fat core containing a fat-soluble vitamin encased within a heat denatured water-resistant proteinaceous digestible shell, said beads being prepared by the method of claim 2.

7. Dry, discrete beads in accordance with claim 6 wherein the fat-soluble vitamin is vitamin A.

References Cited in the file of this patent

UNITED STATES PATENTS

| | | |
|---|---|---|
| 1,622,390 | Miller | Mar. 29, 1927 |
| 2,206,113 | Nitardy | July 2, 1940 |
| 2,218,592 | Taylor | Oct. 22, 1940 |
| 2,283,531 | Briod | May 19, 1942 |
| 2,410,455 | Musher | Nov. 5, 1946 |
| 2,650,895 | Wallenmeyer et al. | Sept. 1, 1953 |

FOREIGN PATENTS

| | | |
|---|---|---|
| 297,256 | Great Britain | Sept. 20, 1928 |
| 301,651 | Great Britain | Dec. 6, 1928 |
| 681,931 | Great Britain | Oct. 29, 1952 |

OTHER REFERENCES

Sandell: Quarterly Journal of Pharmacy and Pharmacology, January–March 1947, p. 68.

Burns: Industrial and Engineering Chemistry, vol. 43, July 1951, pp. 1592, 1593.